United States Patent

Asenstorfer et al.

[11] Patent Number: 5,860,698
[45] Date of Patent: Jan. 19, 1999

[54] ROCKER DRIVE FOR CHILD RECLINERS

[75] Inventors: Ludwig Asenstorfer, Penzberg; Markus Fischer, Achmühle, both of Germany

[73] Assignee: Systec Ausbausysteme GmbH, Puchheim, Germany

[21] Appl. No.: 748,486

[22] Filed: Nov. 8, 1996

[30] Foreign Application Priority Data

Nov. 11, 1995 [DE] Germany ............. 295 17 900 U

[51] Int. Cl.⁶ .................................................. A47C 3/02
[52] U.S. Cl. .................................... 297/260.2; 297/217.4
[58] Field of Search ............... 5/108, 109; 297/260.1, 297/260.2, 271.5, 271.6, 181, 217.4, 217.3, 258.1, 183.3, 183.4, DIG. 11, 250.1; 601/24, 26, 49, 50, 51, 52, 53

[56] References Cited

U.S. PATENT DOCUMENTS

| | | | |
|---|---|---|---|
| 42,745 | 5/1864 | Brown ......................... | 5/108 X |
| 2,689,355 | 9/1954 | DeFrank ....................... | 5/109 |
| 2,830,815 | 4/1958 | Hawes . | |
| 2,916,745 | 12/1959 | Lesk et al. ................... | 5/109 |
| 3,139,630 | 7/1964 | Hunt ............................ | 5/109 |
| 3,225,365 | 12/1965 | Miller et al. . | |
| 3,371,358 | 3/1968 | Shackel . | |
| 3,653,080 | 4/1972 | Hafele ......................... | 297/260.2 X |
| 3,851,343 | 12/1974 | Kinslow, Jr. ................. | 5/109 |
| 3,886,608 | 6/1975 | Casella ....................... | 297/260.2 X |
| 4,141,095 | 2/1979 | Adachi ........................ | 297/DIG. 11 X |
| 4,602,358 | 7/1986 | Sato . | |
| 4,656,680 | 4/1987 | Wilson ......................... | 5/108 |
| 4,793,010 | 12/1988 | Gross et al. . | |
| 4,985,949 | 1/1991 | Jantz ............................ | 5/109 |
| 4,987,624 | 1/1991 | Nafti . | |
| 5,244,292 | 9/1993 | Wise ............................ | 297/183.3 X |
| 5,482,352 | 1/1996 | Leal et al. . | |
| 5,542,587 | 8/1996 | Broz et al. ................... | 297/183.3 X |
| 5,624,156 | 4/1997 | Leal et al. . | |

FOREIGN PATENT DOCUMENTS

| | | |
|---|---|---|
| 1294774 | 4/1962 | France ............. 5/109 |
| 1343876 | 11/1962 | France . |
| 1323337 | 2/1963 | France . |
| 1501951 | 11/1967 | France . |
| 2405674 | 10/1977 | France . |
| 2638343 A1 | 5/1990 | France . |
| 7031225 | 8/1970 | Germany . |
| 2541935 | 3/1977 | Germany . |
| 3042314 | 5/1981 | Germany . |
| 8524462.7 | 2/1986 | Germany . |
| 8619358.9 | 10/1986 | Germany . |
| 9002557.1 | 9/1990 | Germany . |
| 9202900.0 | 8/1992 | Germany . |
| 9313998.5 | 2/1994 | Germany . |
| 2276539 | 10/1994 | United Kingdom . |
| WO 93/09702 | 5/1993 | WIPO . |

*Primary Examiner*—Milton Nelson, Jr.
*Attorney, Agent, or Firm*—Panitch Schwarze Jacobs & Nadel, P.C.

[57] ABSTRACT

A device for generating a rocking motion in child recliners and the like includes a lift drive with a coupling element, wherein the coupling element of the lift drive can be brought directly into engagement with the recliner in a detachable manner without intermediate elements and assembly operations.

20 Claims, 7 Drawing Sheets

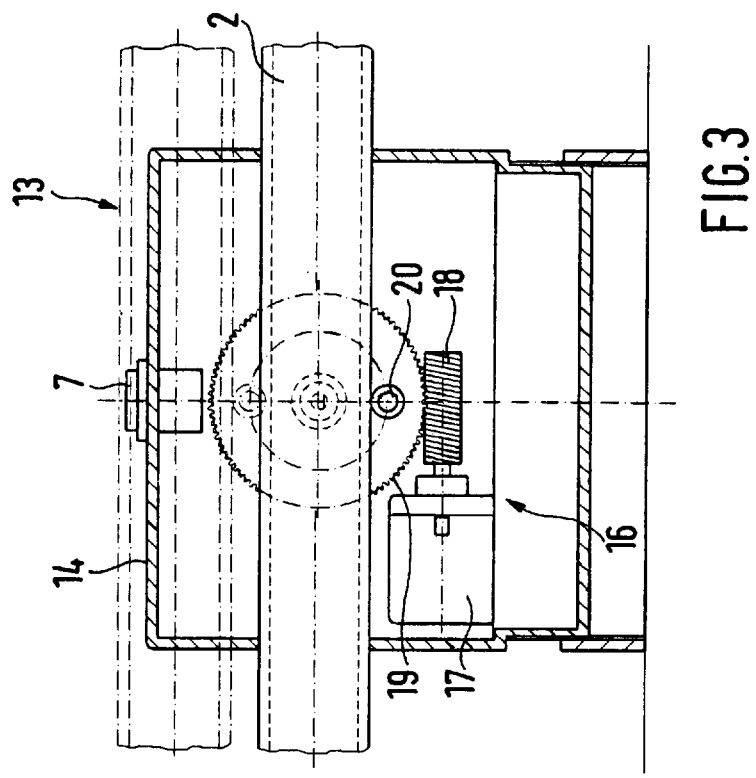
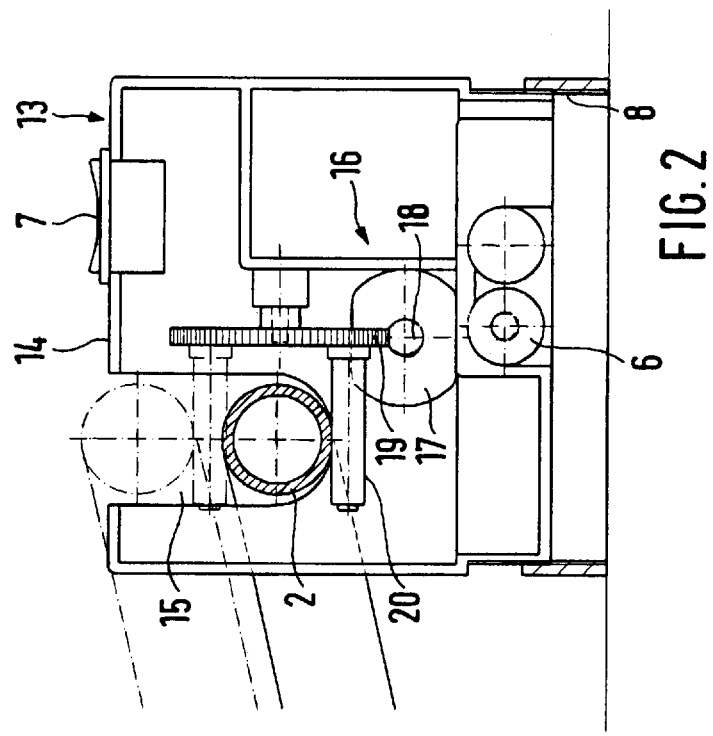

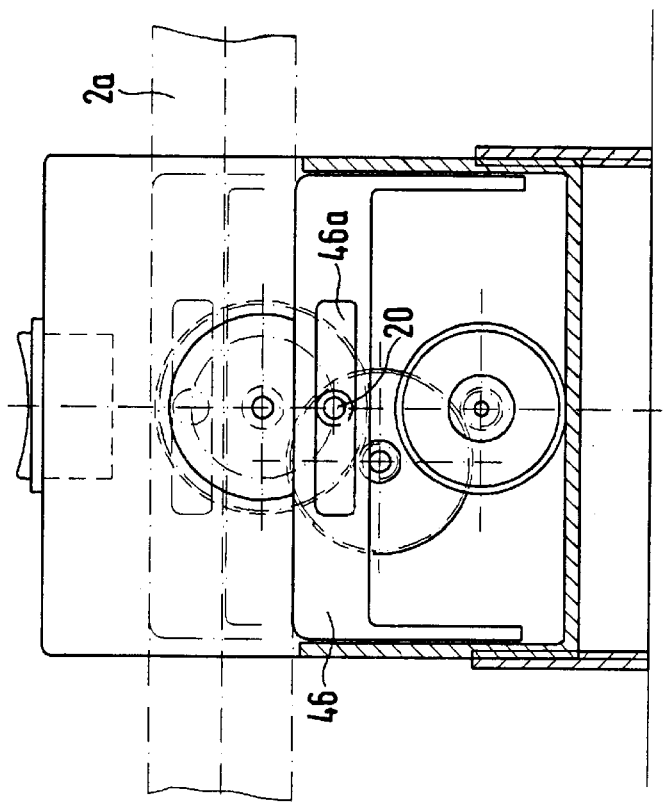
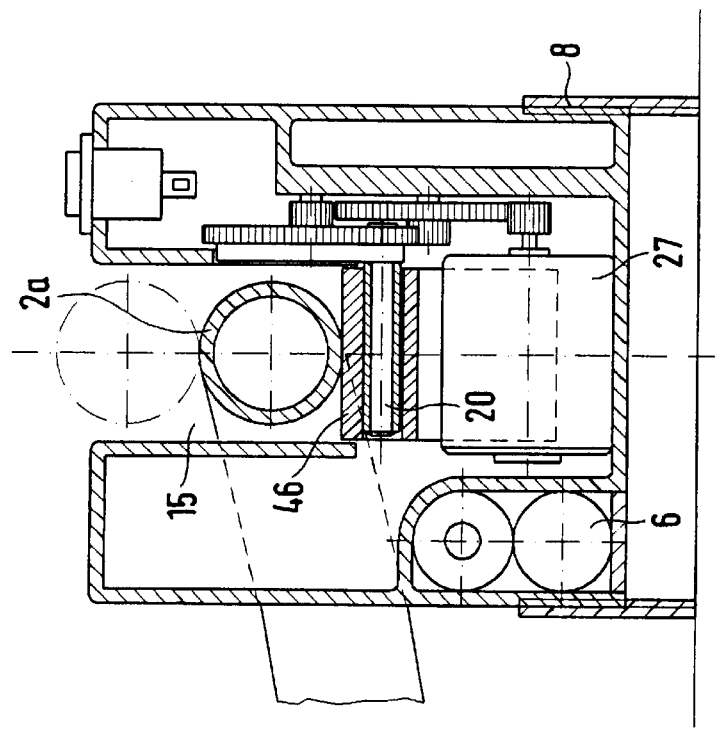

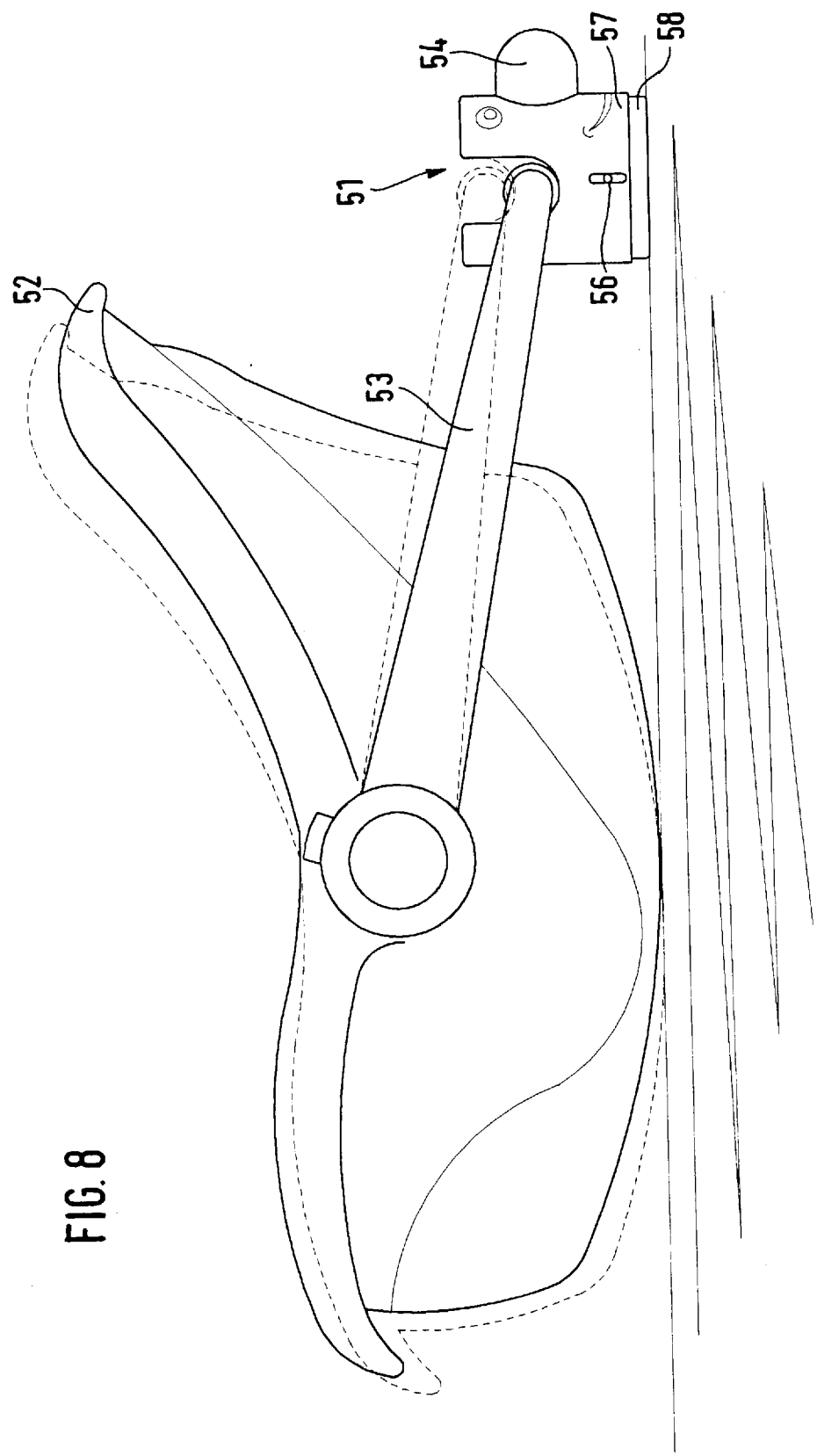

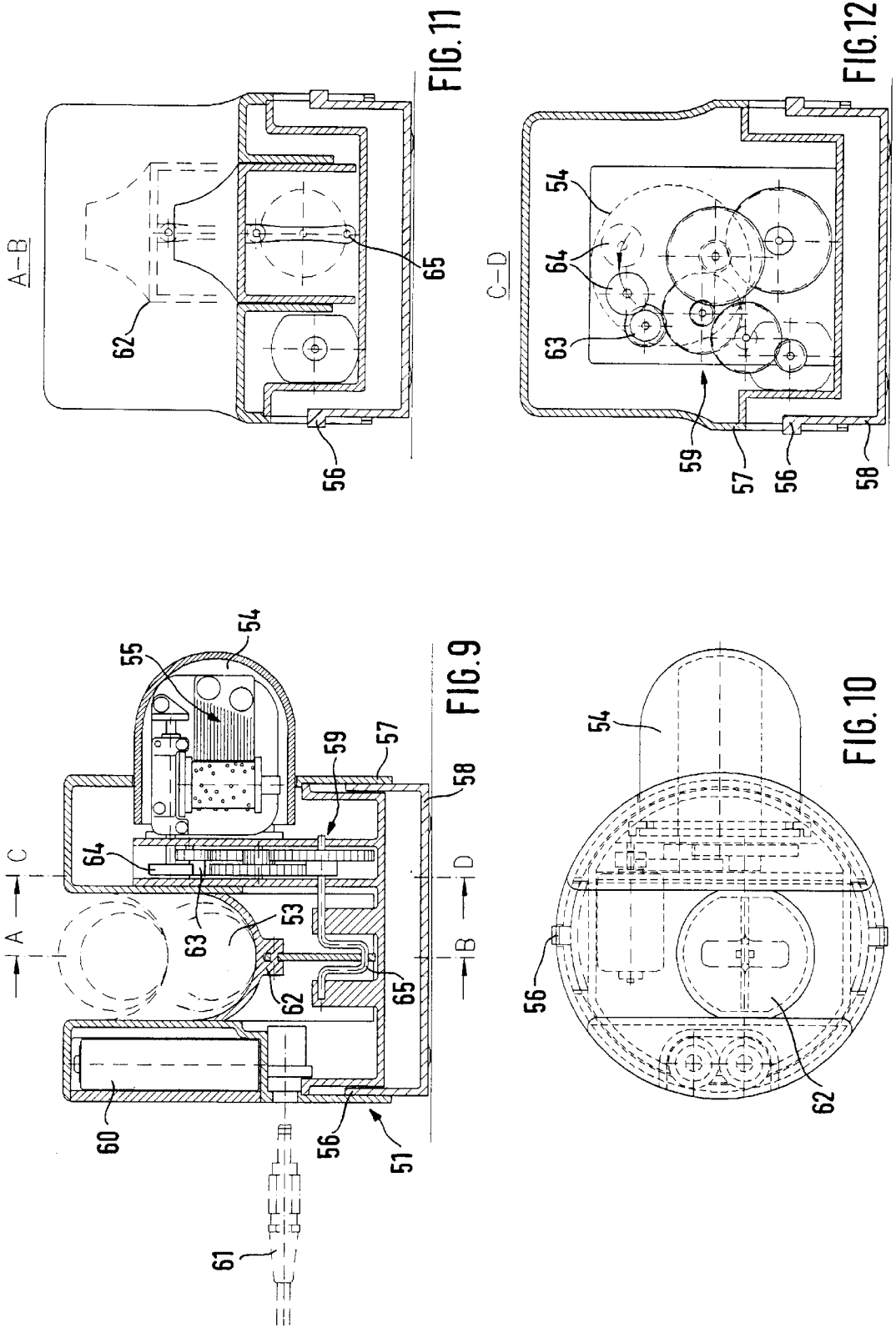

ROCKER DRIVE FOR CHILD RECLINERS

BACKGROUND OF THE INVENTION

The present invention concerns a device for generating a rocking motion in child recliners and the like, comprising a lift drive with coupling element. With the aid of such devices it is possible to set children's reclining chairs, baby carriages and the like into an even rocking motion in order to calm the child without the caretaker having to act himself.

An automatic rocking device of this type is known from DE-OS 25 41 935, for example, wherein the rocking device is mounted and braced by special inelastic securing cords between the axle of a baby carriage and the pushing handle. The rocking device itself consists of an eccentric drive which generates a lifting motion by means of a linkage and continuously changes the distance between the axle and the pushing handle with the aid of the securing cords, whereby a rocking motion of the baby carriage results.

The basic disadvantage of this rocking device which is braced between the axle and the pushing handle lies in the fact that the spring action of the baby carriage is lost, which is necessary to insulate the baby carriage basket from unevenesses of the ground. Accordingly, when pushing the baby carriage, the advantage of the imposed even rocking is bought with the disadvantage of the loss of the spring action and consequently with a more unsteady riding behavior. This leads to having to remove the rocking device along with the securing cords before pushing the baby carriage over longer distances. Later, these elements must be reinstalled while simultaneously prestressing the distance between pushing handle and axle.

Even more involved is the use of the known rocking device with children's recliners, because the rocking device can only transform the lifting motion into a rocking motion when the securing cord can be installed and prestressed between the reclining chair and an external fixed point.

BRIEF SUMMARY OF THE INVENTION

Beginning from this background, underlying the present invention is the object of making available a rocking device which is not only easier to handle, but which can also be more versatile to use. This objective is accomplished in accordance with the invention in that the coupling element of the lift drive can be attached in a separable manner directly to the recliner without intermediate elements and assembly operations. For this, the rocking device is expediently placed on the same plane as the recliner, which will be discussed below by way of example, but not exclusion. As a result, the lifting motion of the coupling member leads directly to a change in the height of the part of the recliner which is fastened to the coupling element, whereby the desired rocking motion results.

The advantage which results from this is that the rocking device operates completely independently from prestressings and availability of securing places, and can be set up rapidly and effortlessly owing to the lack of coupling elements, securing cords and the like. Attaching the rocking device to the recliner takes place just as easily as removing it: one merely places the rocking device under one of the rockers of the reclining chair, or under a cross bar between the two rockers, so that the coupling element achieves an engagement with the recliner.

This engagement can take place by means of a separable plug connection, especially a fork, one of whose tines engages above and the other tine engages below an appropriate part of the recliner. In this way, the rocking device only needs to be set up horizontally, whereby one places a book or something similar under the rocking device for adapting to the height of the corresponding reclining chair part, if necessary.

If in accordance with one construction of the lift drive, to be described in detail later, the fork is not driven along a purely vertical lifting motion, but rather by an eccentric, then it only needs to be mounted rotabably relative to the eccentric, in order for it to be able to maintain its position with the tines lying above each other during its cycle. In both cases, such a form-locking coupling assures that the recliner follows the lifting motion of the rocking device in any position.

It is, however, especially advantageous to realize the separable connection between coupling element and reclining chair by means of the following fastening variant which is even simpler with regard to construction expenditure: by a suitable choice of the position of the rocking device under the recliner, the force of the weight of the reclining chair can be utilized for contact between the coupling element and recliner. Here the point of contact of the reclining chair must always be pressed in the direction of the coupling element by the force of its own weight, in order to assure a constant connection and consequently a continuous transmission of the lifting motion to the reclining chair. The coupling element can in this case be constructed as a simple lever which engages the recliner from below, because only a compressive or supporting force need be generated.

The solution of the invention guarantees not only the simple installation and removal of the rocking device from the recliner, but in addition makes possible versatile use in connection with reclining chair or rocking elements, as for example with a baby carriage, in which the rocking device can be positioned under one of the two wheel axles, whereupon the lifting movement of the rocking device imparts a rocking movement of the entire baby carriage. Not only is all assembly expenditure eliminated here, but the rocking motion can even be transferred to baby carriages without springs.

The rocking device of the invention can even be used in a simple manner with small children's beds, child carrying bags and the like, whereby of course the size of the rocking device must always have a suitable relationship to the size of the rocking element to be lifted. Thus with the children's recliner, the force of weight exerted upon the rocking device must be just so great that the recliner is in constant contact on the coupling element. With a carrying bag, which cannot be independently rocked, with a baby carriage or a child's bed, in each case, perhaps about half of its weight must be lifted.

The lift drive advantageously includes an eccentric with an eccentrically supported coupling element in the form of a bolt projecting approximately horizontally. This bolt can be provided with a low friction coating so that it causes no disturbing noise during the cycle owing to its contact with the corresponding recliner part, or the bolt has a ball bearing whose outer ring engages with the reclining chair part.

A (small) electric motor may be considered for construction of the lift drive, which is geared down with toothed gears, a worm gear drive or the like. A ready geared motor can, however, be used instead of this.

It is especially advantageous if the rocking device is constructed so as to be self-adjustable in height. It can in this way be adapted to respective areas of use and can also be rapidly reequipped for another application. This height adjustment can, for example, comprise a screw device or plug inserts.

A basic advantage of the present invention results when the drive parts of the lift drive are surrounded by a housing, in order to prevent any danger of injury due to reaching into the moving parts. This assures that the large driving forces exerted by the driving element are safely screened from the surroundings, especially when an eccentric drive is used.

It is less essential, but just as advantageous, if the connection of the coupling element with the recliner is shielded wherein, for example, the reclining chair dips into the housing during the lifting motion. If one were to reach in between the recliner and coupling element or housing, then only the respective weight forces of the reclining chair would be operating, which amount to but a fraction of the drive forces of the eccentric drive.

Various advantageous accessories are conceivable for the rocking device itself as well as for the lift drive: for example, an interval switch can be provided with the lift drive, which in any given case interrupts two lifting cycles by a longer standstill phase of the lift drive. In addition, a control device for automatic restarting can be provided, which responds to a predetermined level of noise in order to activate the lift drive whenever a child lying in the recliner must be quieted.

Finally, another advantage of the invention lies in the rocking device having a musical clock in addition to a lift drive, which expediently is at least indirectly coupled to the lift drive and can be actuated by the motion of the lift drive. Thus, for example, the coupling can take place mechanically with a musical clock which can be mechanically actuated, so that the musical clock stands in engagement with a gear element by means of a drive element assigned to it, and at all times runs only when the lift drive is also actuated. This coupling can of course also take place electronically, whereby here the musical clock can also perhaps consist of a microchip. However, the mechanically actuatable musical clock in particular uses components of the lift drive, which are present at any rate, for the mechanical connection, and also offers no greater resistance to the lifting motion. Like the control device for automatic restarting when a certain noise level is exceeded, the musical clock which is connected with the lift drive also guarantees that a noise action by the musical clock takes place only during the rocking phase, thus while the child is to be calmed, while the musical clock does not operate during the resting phase.

In addition, it is especially advantageous if the musical clock is constructed so that it may be removed and replaced, whereby first it can be brought out of contact with the lift drive for a noiseless lift motion, and second so that another musical clock may be substituted for it, and thus different melodies can be played in connection with the same rocking device.

Regarding the shape and appearance of the rocking device, this is advantageously fashioned after an animal or human head in order first to accommodate the elements essential to functioning and to make it possible to arrange them more easily therein, and second to adapt to the surroundings of a child's recliner, which is as a rule constructed appropriately for a child. If the rocking device is provided with a switch for turning the lift drive on and off, this can be integrated into a part of the head-shaped rocking device, for example in the nose. This part of the head can in addition also serve to accommodate the musical clock, whereby in this case the entire switch can be replaced together with the musical clock. In addition to switching the lift drive on and off, the switch can also be used to actuate the musical clock and to control its coupling with the lift drive.

However the rocking device may be constructed or outfitted, it is in any case recommended to make it adjustable as to height for adapting the contact point of the lift drive to the child reclining chair. This can, for example, take place through two housing elements which can be slid vertically in relation to each other, whereby stop or detente means corresponding to each other can be provided on both housing elements for mutual fixing at various height positions. Simple stop means can, for example, comprise a serrated slat constructed to be especially elastically yielding, and a catch or detente engaging in the serrated slat, whereby the serrated slat is best accessible from the housing exterior. With a housing modelled after a head, the height adjustment can, for example, be situated in the neck region.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 shows the rocking device in enlarged sectional side elevation;

FIG. 3 shows the rocking device of FIG. 2 in a sectional front view;

FIGS. 4–7b show alternative embodiments of a rocking device in sectional side elevation;

FIG. 8 shows a child's reclining chair with a further rocky g device of the invention in side elevation;

FIG. 9 shows the rocking device of FIG. 8 in sectional side elevation;

FIG. 10 shows the rocking device of FIG. 8 in sectional plan view;

FIGS. 11 and 12 show the rocking device of FIG. 8 in sectional front view;

DETAILED DESCRIPTION OF THE INVENTION

Figure 1:
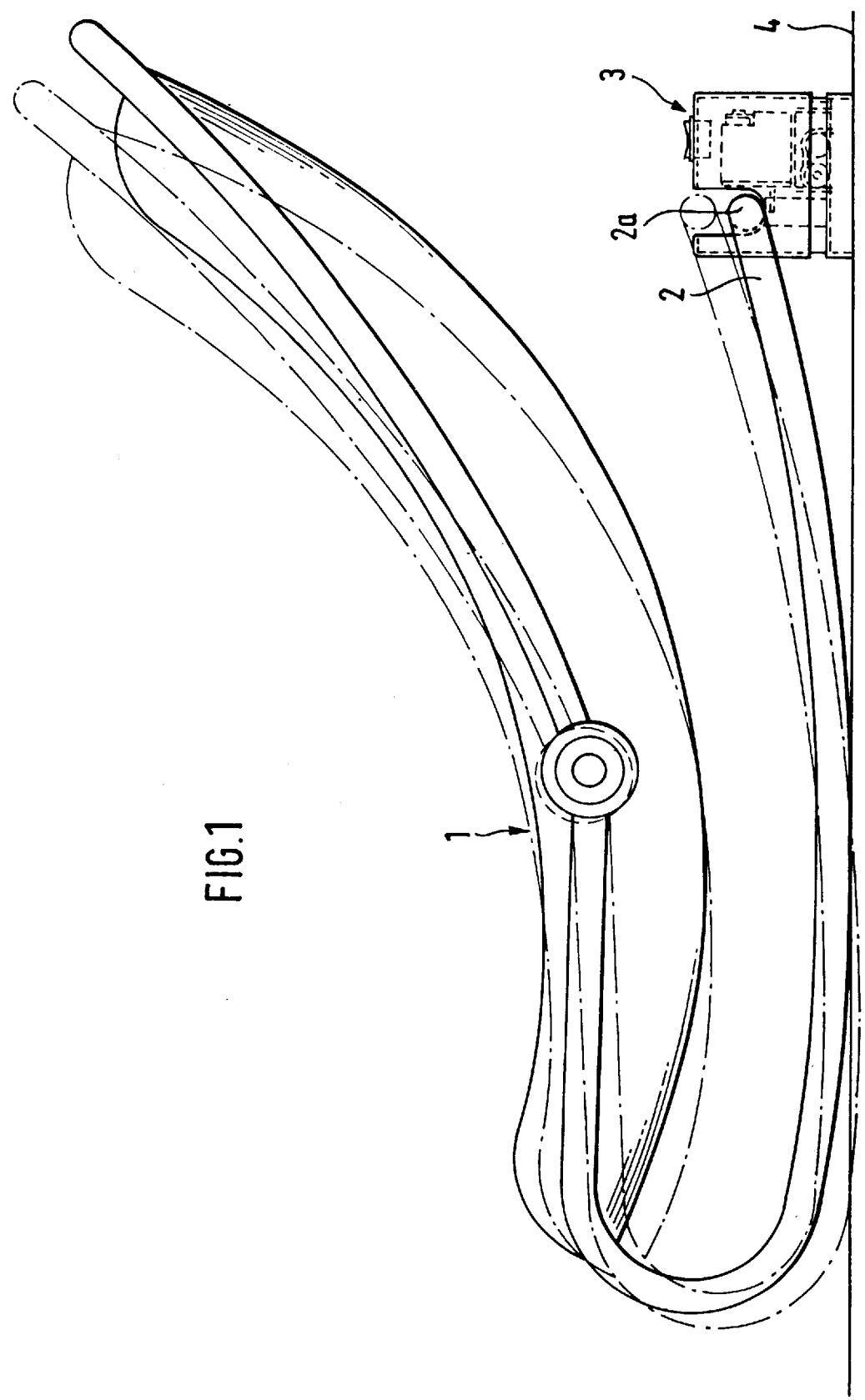
FIG. 1 is a side view of a child's recliner with a rocking device of the invention.

A child's reclining chair is depicted in FIG. 1, on whose the free rocker end 2 is provided a rocking device 3, which stands in contact with a cross bar 2a. This rocking device 3, whose exact construction can be more clearly recognized from FIGS. 2–6, stands on the same level 4 as the child's recliner. Of course, it can also be necessary to position the rocking device somewhat higher by means of a corresponding base so that the desired positioning between the cross bar 2a of the recliner and the rocking device is guaranteed.

FIG. 2 depicts a rocking device 13 of the invention which has a cylindrical housing 14. A slot 15 is provided in this housing, opening at the top, for receiving the free end 2 of the reclining chair rocker, and along which the rocker can move corresponding to the lifting motion of the rocking device. The rocking motion itself is generated by a lift drive 16 which comprises a small motor 17, a worm gear 18, a spur (toothed) wheel 19, and a bolt 20 arranged eccentrically on the spur wheel, projecting approximately horizontally.

The small motor thus transmits a rotating motion to the worm gear 18, which in turn transmits a rotating motion to the spur wheel around an axle perpendicular thereto, whereby the bolt 20 is moved upon a circular path. The recliner rocker end 2, which is situated in position on the bolt 20, is thereby elevated or lowered corresponding to changes in height which the bolt traverses in its circular motion.

As indicated in FIG. 1 in dashed lines, this lifting motion of the reclining chair rocker end 2a leads to a rocking motion of the entire child's recliner 1. FIG. 3 shows the rocking device 13 of FIG. 2 with the corresponding components in sectional front view.

Figure 4:
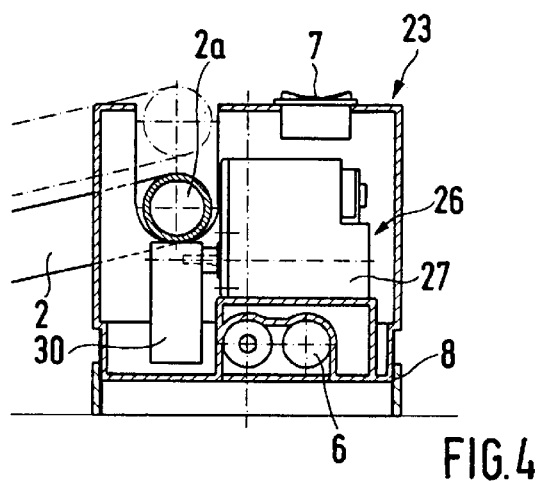

An alternative type of construction of a rocking device 23 which has a lift drive 26 is represented in FIG. 4. This lift drive 26 has of a miniature geared motor 27 which drives an eccentric disk 30. While the bolt 20 in FIG. 2 is arranged eccentrically on the spur wheel 19 in FIG. 2, whereby however the center axis of the drive shaft coincides with its axis of rotation, the center axis of the eccentric disk 30 is now displaced relative to its axis of rotation. Here also the miniature geared motor 27 transmits a rotary motion to the eccentric disk which generates a corresponding change in height of the recliner rocker end 2a and a rocking motion of the recliner 1.

Figure 5:
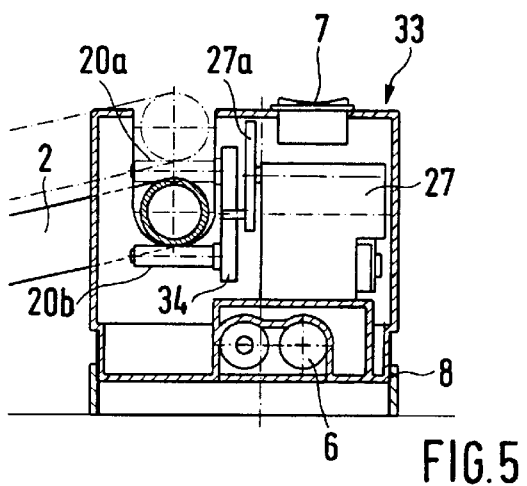

FIG. 5 depicts a further alternative. Here, the drive motor 27 drives a fork 34 with two horizontally projecting bolts 20a and 20b arranged one above the other through an eccentric disk 27a, the fork being rotably mounted on the eccentric disk. The bolts 20a and 20b accommodate the recliner rocker end 2a or a corresponding other part of the reclining chair therebetween. Desirably, the distance between the bolts 20a and 20b is adjustable, perhaps through an arresting or snap connection or the like, in order to adapt it to varying dimensions of the corresponding recliner part 2a. It is moreover important that the fork 34 for its part be rotably mounted on the eccentric 27a so that its rotary motions generate a lifting motion of the fork 34 in the course of which the bolts 20a and 20b largely remain vertically above one another.

Since the reclining chair end 2a is grasped from above as well as from below in this type of construction, one does not need to take into consideration the weight-conditioned pressing, as was the case in the previous types of construction. It must only be assured that the rocking device's 33 own weight is large enough so that it cannot be raised from the floor by the recliner.

It can also be suitable here, as with the other forms of construction, to make the eccentric dimension adjustable in order to influence the size of the lifting motion. This adjustment likewise desirably takes place only through snap or clamp means, so that no tools are required.

Figure 6:
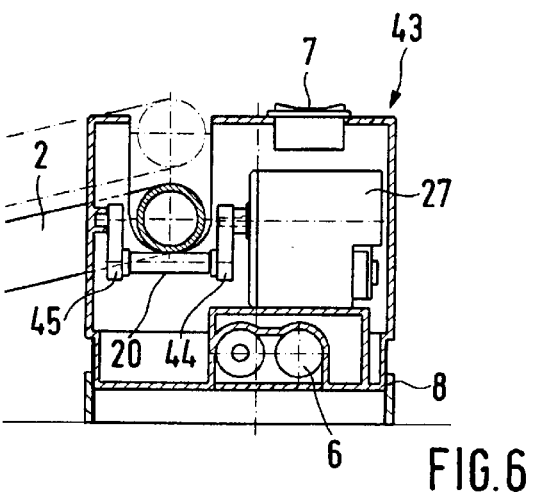

A type of construction is represented in FIG. 6 in which the miniature geared motor 27 transmits the rotational movements to an eccentrically supported bolt 20 which, however, in this case is not mounted on a rotary desk 30, but rather by two crank arms 44 and 45 at its two ends.

The type of construction in FIGS. 7a, 7b is distinguished by the fact that the coupling element 20 is supported in a movable prop 46. This prop is dimensioned so that it fills the horizontal section of the slot 15 in which the lifting motion takes place. This prop follows the lifting motion of the coupling element, but not its lateral movements. For this, it has an approximately horizontal slot 46a in which the bolt of the coupling element is mounted, and the length of which corresponds to the horizontal motion of the bolt 20. In this way, contact of the rotating bolt and consequently the danger of squeezing a child's finger between the housing and the coupling element is ruled out.

Finally it is common to all types of construction that the rocking devices are driven by batteries 6, whereby, however, other forms of current or energy supply are also conceivable. In addition, all types of construction have an on-off switch 7, as well as a height adjustment 8 on the respective pedestal of the rocking device.

FIG. 8 depicts a further embodiment of a rocking device 51 for a child recliner 52 whereby the child reclining chair engages the rocking device through a carrying handle 53. As is apparent from the side view in FIG. 8, the rocking device 51 has a form and appearance which is modelled after a human head. By this means, first the technical character of the rocking device can be somewhat concealed. Second, however, an elucidation of the individual functional parts can be obtained through this: thus, the switch for turning the lift drive on and off as well as musical clock 55 (visible in subsequent Figures) are installed in the nose 54, which is not merely spatially exaggerated.

In addition, a height adjusting device 56, by means of which the rocking device can be adapted in its base position to the optimal engagement position of the child recliner, is integrated into the lower part of the head, that is, in the neck region. As is much more clearly visible from the following Figures the two housing parts 57 and 58 are slid telescopically into or away from each other by means of the height adjusting device 56.

FIG. 9 depicts the rocking device 51 in sectional presentation and clarifies particularly the driving mechanism for generating the lifting motion and for actuating the musical clock. For this purpose, an eccentric drive 59 is supplied with current through a battery 60 or a low voltage plug 61 (depicted by dashed lines in FIG. 9), and thus transmits the rotary motion of the eccentric drive 59 to a lifting prop 62, mounted eccentrically on it, upon which the carrying handle 53 of the child's recliner 52 lies. This lifting prop 62 is moved up and down by the eccentric drive 59, thus creating a tilting of the recliner 52 through its underside, whereby it executes a rocking motion.

A drive element 64 can be mechanically coupled to a gear element 63 of the eccentric drive, which rotates during the operation of the lift drive and which transmits the rotational movement to the musical clock in the coupled state. The mechanical coupling is especially recognizable in FIG. 12, which represents a section along the line C-D of FIG. 9, wherein the drive element 64 is presented in the upper region first in dashed lines and second with solid lines. In the dashed line position, the drive component 64 is not in engagement with the gear element 63 of the eccentric drive 59, while a rotation of the nose 54 (likewise depicted using dashed lines) leads to a tilting of the drive element 64, indicated by the arrow in FIG. 12, at the end of which the drive element engages in the gear element 63. In this position the driving motion of the eccentric drive 59 is transmitted to the drive element 64 and thereby to the musical clock 55.

FIG. 9 depicts the major working components of the mechanical clock 55 within the nose 54. Those components are a note producing comb pointed to by the lead line of numeral 55, with a plurality of teeth or tines of varying lengths, and an actuating cylinder. Both components are unnumbered but are recognizable in the figures. The free ends of the teeth or tines are juxtaposed to the cylinder, the surface of which is dotted to represent disruptions which engage and release the teeth of the comb in order to pluck the teeth to produce the notes of a musical tune. It will be recognized that this constitutes a mechanical, music box type mechanism.

FIG. 10 depicts the rocking device 51 in plan view and, particularly together with FIG. 9, shows the shape of the lifting cylinder 62, which moreover is also illustrated in FIG. 11, a sectional view along line A-B of FIG. 9.

In FIG. 11 the two dead points of the lifting motion of the lifting cylinder 62 are first represented, and in addition, the radius of the eccentric shaft 65 which engages the lifting cylinder underside, which radius is traversed by the eccentric drive 59, depicted in side elevation in FIG. 9.

Figure 13:
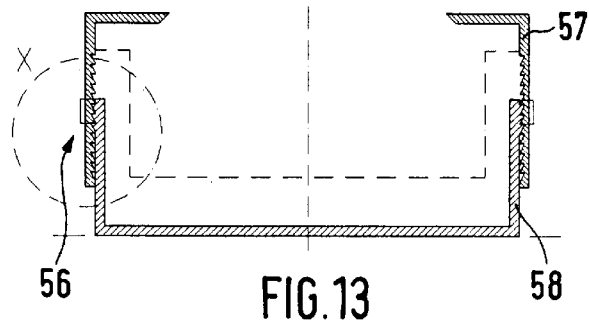
FIGS. 13 and 14 show a height adjustment mechanism of the rocking device of FIG. 8 in single representation.
Figure 14:
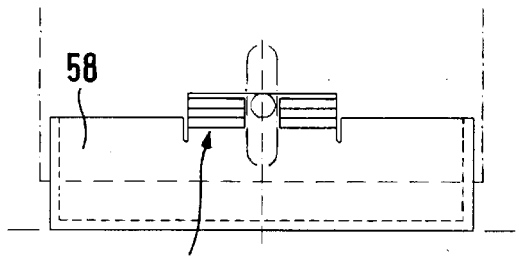
Figure 15:
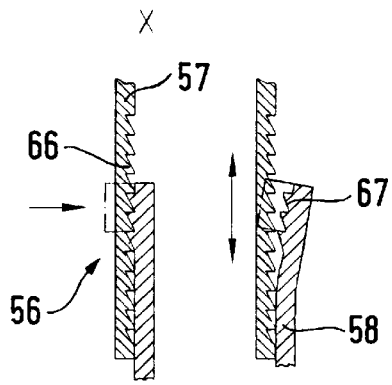

FIGS. 13 to 15 clarify the height adjusting device 56, already indicated in FIG. 8 and likewise shown in FIGS. 9 to 11, which comprises an arresting or catch connection between the two housing parts 57 and 58, which are arranged inside each other. For this, the upper housing half 57 has a vertical serrated slat 66 with stops or detentes arranged on top of one another, while the lower housing half 58 includes correspondingly constructed stops 67 engaging these.

One of the two detente means must be constructed to be somewhat yieldable in a horizontal direction, so that a relative sliding of both housing halves is possible by bringing them laterally out of contact with each other. The principle used in this connection is schematically explained in FIG. 15.

Figures 16, 17:
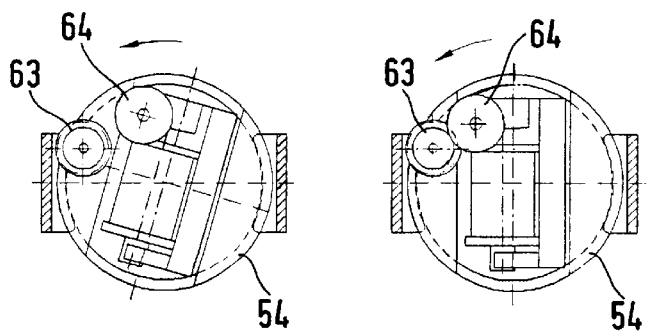
FIGS. 16 and 17 show a detail of the rocking device of FIG. 8 in sectional front view.

FIGS. 16 and 17 finally show once again the tilting of the nose already indicated in FIG. 12, whereby the driving element 64 of the musical clock can be brought into contact with the gear component 63 of the eccentric drive. With a position according to FIG. 16, the eccentric drive can transmit a lifting motion to the lifting cylinder 62 and the recliner 52 without this being associated with the development of noise owing to the musical clock 55.

In summary, the advantages of the present invention lie in the fact that first, a danger of injury is largely ruled out by concealing the lift drive components, that the motion of the eccentric drive which is at any rate necessary for the lifting motion is also used at the same time to drive a musical clock, which also only runs when the lift drive is activated, and finally that the switch for turning the lift drive on and off is distinguished or emphasized in that commensurate with a housing built in the shape and appearance of a human head, it is likewise constructed in the shape of a part of this head. This part can in addition serve to receive a musical clock which can suitably be easily removed and replaced by another musical clock.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device for generation of a rocking motion in a child recliner, comprising a lift drive having a coupling element, wherein the coupling element is directly engagable with a recliner in a detachable manner without intermediate elements and assembly operations, and a musical clock, wherein the musical clock is at least indirectly coupled to the lift drive and is activatable by motion of the lift drive, wherein the coupling is mechanical, such that the musical clock is actuated mechanically, and wherein the musical clock has a drive element which engages with a gear element of the lift drive.

2. The device according to claim 1, wherein the musical clock (55) is constructed to be removable and replaceable.

3. The device according to claim 1, wherein the lift drive has a control for automatic restarting, wherein the control responds to a predetermined noise level.

4. The device according to claim 1, wherein engagement of the coupling element (20, 30, 46) with the recliner (1) takes place through force of weight of the recliner.

5. The device according to claim 1, wherein the lift drive (26) has a geared motor (27).

6. The device according to claim 1, wherein the lift drive has an interval switch.

7. The device according to claim 1, wherein the lift drive includes a worm gear (16).

8. The device according to claim 1, wherein engagement of the coupling element (20, 30, 34) with the recliner (1) takes place through a separable plug connection.

9. The device according to claim 8, wherein the coupling element is selected from the group consisting of a bolt (20), a fork (34) and a lifting prop (46).

10. The device according to claim 1, wherein the coupling element (20, 30) comprises an eccentric.

11. The device according to claim 5, wherein the coupling element (20, 30) has an adjustable eccentricity.

12. The device according to claim 1, further comprising height adjustment means for adapting a contact point of the lift drive (59) to the child recliner (52).

13. The device according to claim 12, wherein the height adjustment means comprises two housing parts (57, 58) which enclose the lift drive (59), and stop elements (66, 67) which cooperate with each other and are provided on respective housing parts for setting various height positions.

14. The device according to claim 13, wherein the stop elements (66, 67) comprise a serrated slat constructed to be horizontally elastically yielding and of a detente engaging with the serrated slat.

15. The device according to claim 1, wherein the lift drive (16, 26) is enclosed by a housing.

16. The device according to claim 15, wherein the housing has a shape and appearance of a human head or animal head and has a switch (54) for turning the lift drive (59) on or off, the switch being integrated into a part of the human head or aminal head.

17. The device according to claim 16, wherein a musical clock (55) is integrated into the part of the human head or animal head holding the switch (54).

18. The device according to claim 16, wherein the switch (54) also controls actuation of the musical clock (55).

19. A device for generation of a rocking motion in a child recliner, comprising a lift drive (16, 26) having a coupling element (20, 30, 34), wherein the coupling element is directly engagable with a recliner in a detachable manner without intermediate elements and assembly operations, and height adjustment means for adapting a contact point of the lift drive (59) to the child recliner (52), wherein the height adjustment means comprises two housing parts (57, 58) which enclose the lift drive (59) and stop elements (66, 67) which cooperate with each other and are provided on respective housing parts for setting various height positions.

20. A device for generation of a rocking motion in a child recliner, the device comprising:

a lift drive having at least a coupling element detachably engagable to the recliner without intermediate elements and assembly operations and a gear element; and a musical clock having a drive element at least indirectly mechanically coupled to the gear element of the lift drive, the musical clock being activatable by motion of the lift drive.

* * * * *